May 31, 1932. E. H. ALDEBORGH 1,861,172
PLUG GAUGE
Filed July 6, 1928
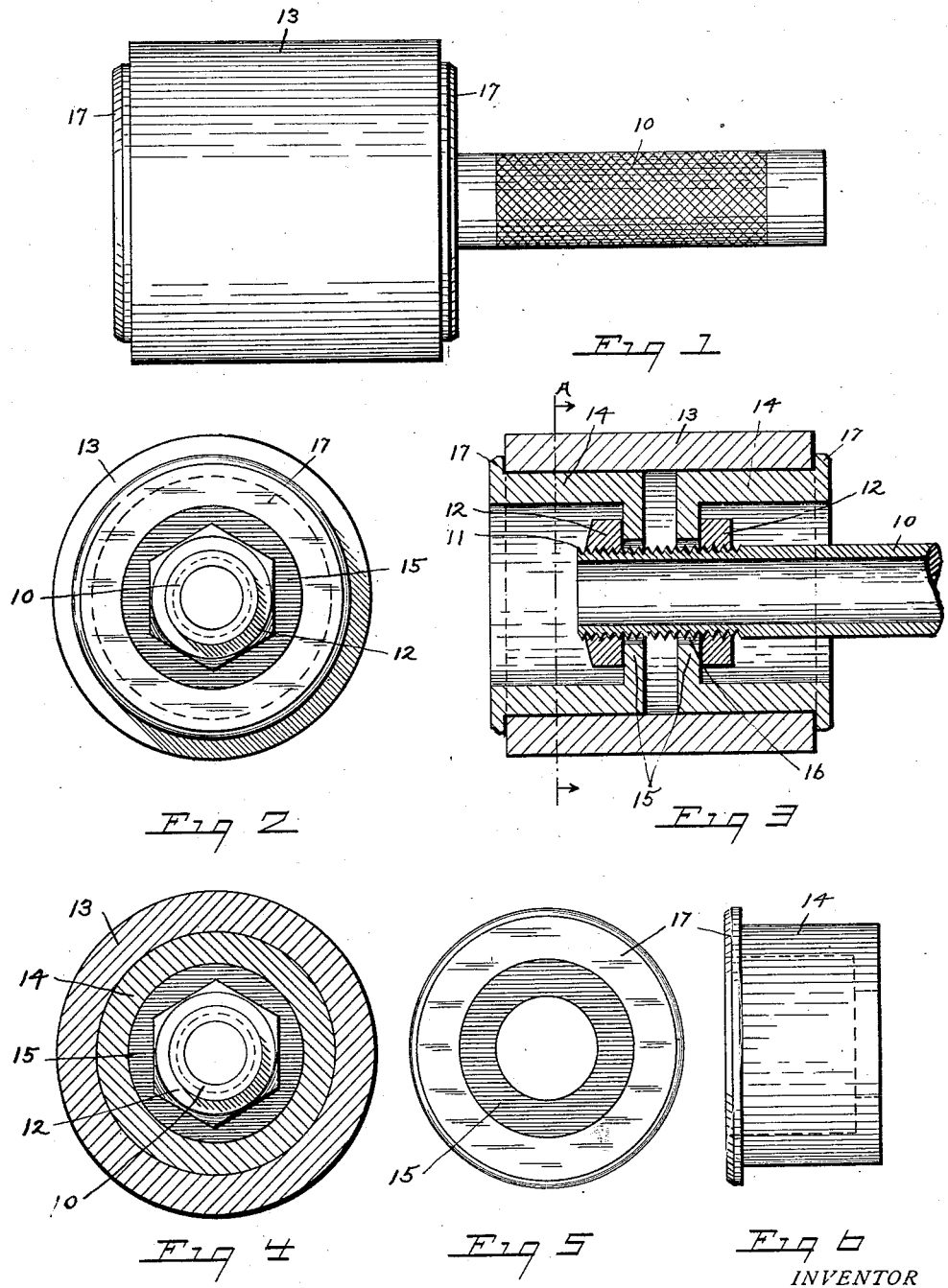
INVENTOR
Erik H. Aldeborgh
BY John J. Thompson
ATTORNEY Patented May 31, 1932

1,861,172

UNITED STATES PATENT OFFICE

ERIK H. ALDEBORGH, OF POUGHKEEPSIE, NEW YORK, ASSIGNOR TO STANDARD GAGE COMPANY, INC., OF POUGHKEEPSIE, NEW YORK, A CORPORATION OF NEW YORK

PLUG GAUGE

Application filed July 6, 1928. Serial No. 290,841.

This invention relates to a plug gauge of that type used in the checking or measuring of internal diameters of the larger sizes where a solid plug gauge can not be employed to advantage either in its use or construction, the size adding so much to the weight of a solid gauge that it is not only expensive to manufacture, but in use has no "feel".

The object of the invention is to provide a gauge of this kind which shall be light, strong, compact and contain few parts, being cheap to manufacture, and easy to assemble.

Another object of the invention is to provide a plug or thread gauge, in which the gauging member may be interchangeable with one handle.

Still another object being to construct a gauge in which the machine operation in its manufacture is reduced to a minimum, the parts being reversible thus providing for double wear.

In the drawings:—

Figure 1 is a side elevation of a plug gauge embodying my invention.

Figure 2 is an end view of the same.

Figure 3 is a longitudinal sectional view, showing the construction of the same.

Figure 4 is a cross sectional view, taken on the line A—A of Figure 3.

Figure 5 is an end view of the combined bushing and clamping member.

Figure 6 is a side elevation of the same.

Referring to the drawings:—

The invention comprises in connection with a tubular handle 10, formed at one end with the external threads 11, and supplied with the two locking nuts 12 as shown, the gauging member 13 comprising a piece of tubular stock, which is simply faced off square at the two ends, and turned, hardened and ground on its outer surface, while the inner surface or bore is left without any machining, thus not only reducing the cost, but taking advantage of the natural scale left on its inner surface.

To mount this gauging member 13 upon the handle 10, in both a demountable and reversible manner, there are provided, the combined clamping and bushing members 14, which are tubular or cup shaped in form with bottoms 15 having central orifices 16; while the opposite ends are provided with collars or flanges 17; the outer diameter of said bushings 14 equals or is slightly smaller than the inside diameter of the gauging member 13, so that they may be inserted within the two ends thereof as shown in Figure 3; with the flanges 17 engaging the ends of said gauging member 13, and the bottoms 15 adjacent to each other and spaced apart.

Within the alined holes or orifices 16, is placed the threaded end of the tubular handle 10, and the locking nuts 12 are brought into clamping engagement with the inner surface of the bottoms 15; thus drawing said bushing members 14 together and clamping the same on the gauging member 13.

It will thus be seen that gauging members of different diameters may be readily exchanged with the same handle, by simply providing the combined bushings with the proper size central holes to fit the threaded end of the handle, and also the gauging member may be reversed, end for end to compensate for wear.

Also the combined clamping bushings may be made of some light material such as aluminum, and the handle from light steel tubing, thus providing an instrument which is very light in weight as compared to its size, as gauges made in this style may be of very large diameter.

Having thus described my invention, what I claim as new and desire to secure by Letters Patent, is:

A gauge, comprising a tubular gauging member, a threaded handle for supporting said gauging member, a pair of cup-shaped members mounted on said handle and having flanged lips for engagement with the ends of said tubular member and extending to the substantial center of said tubular member to make a firm connection with the inner wall thereof, and nuts threaded on said handle and engaging the bases of said cup-shaped members for securing said members in position, each of the nuts and each of the cup-shaped members being of identical formation, whereby ready reversal of the parts relative to the tubular member and one another for compensating for wear is accommodated.

In testimony whereof I affix my signature.

ERIK H. ALDEBORGH.